Figure 1:
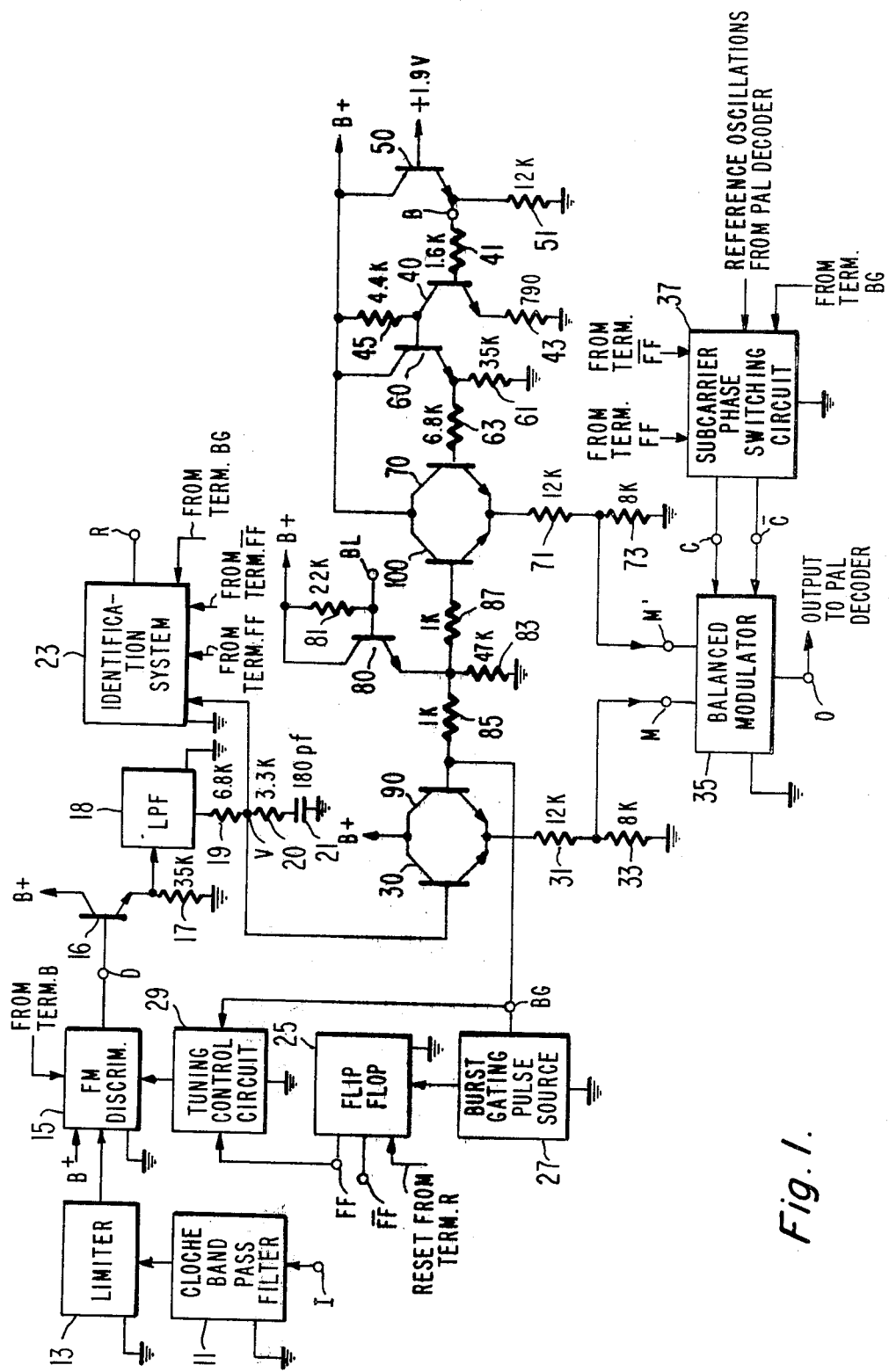

United States Patent [19]

Hinn

[11] 4,263,608
[45] Apr. 21, 1981

[54] BURST INSERTION APPARATUS FOR SECAM-PAL TRANSCODER

[75] Inventor: Werner Hinn, Zollikerberg, Switzerland

[73] Assignee: RCA Corporation, New York, N.Y.

[21] Appl. No.: 106,655

[22] Filed: Dec. 26, 1979

[30] Foreign Application Priority Data

Jan. 9, 1979 [GB] United Kingdom ............. 802/79

[51] Int. Cl.$^3$ ............................................. H04N 9/38
[52] U.S. Cl. ............................................ 358/11; 358/19; 358/40
[58] Field of Search .................. 358/4, 11, 12, 14, 15, 358/16, 21 R, 40

[56] References Cited

U.S. PATENT DOCUMENTS

| | | | |
|---|---|---|---|
| 2,843,658 | 7/1958 | Christian | 358/19 |
| 2,886,632 | 5/1959 | Moore | 358/19 |
| 4,188,638 | 2/1980 | de Haan | 358/11 |

*Primary Examiner*—Jin F. Ng
*Assistant Examiner*—Michael A. Masinick
*Attorney, Agent, or Firm*—Eugene M. Whitacre; Paul J. Rasmussen; William H. Meagher

[57] ABSTRACT

In a SECAM-PAL transcoder, color-difference signals, sequentially recovered from received SECAM signals by a single FM discriminator, are supplied via a first emitter-follower to a first modulating signal input terminal of a balanced modulator, which develops a quasi-PAL signal output using PAL subcarrier frequency oscillations. A DC potential, supplied to a second modulating signal input terminal of the modulator via a second emitter-follower, matches discriminator output level under no-color signal conditions. A third emitter-follower, responsive to a blanking waveform, effects cutoff of the first emitter-follower during blanking periods and delivers elevated blanking pedestal to the first terminal. A fourth emitter-follower, responsive to the same blanking waveform, effects cutoff of the second emitter-follower during blanking periods and delivers matching blanking pedestal to the second terminal. During a portion of the blanking period, a burst gating pulse supplied via the third emitter-follower causes departure from the blanking pedestal level at the first terminal without disturbing the blanking pedestal level at the second terminal, to develop a burst component of controlled magnitude in quasi-PAL signal output.

3 Claims, 2 Drawing Figures

BURST INSERTION APPARATUS FOR SECAM-PAL TRANSCODER

The present invention relates generally to apparatus for transcoding a chrominance signal of a SECAM format to a chrominance signal of a form suitable for further processing by standard PAL-format chrominance signal decoder apparatus, and particularly to such transcoder apparatus incorporating an advantageous system for insertion of periodic bursts of oscillations of PAL subcarrier frequency.

In U.S. Pat. No. 4,233,622, transcoder apparatus is disclosed wherein a SECAM-encoded chrominance signal is converted to a chrominance signal of a quasi-PAL form for further processing in standard PAL decoder apparatus. The transcoder includes an FM detector serving to demodulate respective SECAM subcarriers sequentially, and a modulator wherein the color-difference signals recovered by the FM detector amplitude modulate in appropriate sequence quadrature-related phases of PAL subcarrier frequency oscillations derived from the PAL decoder. This signal conversion approach follows the general principles taught in U.K. Pat. No. 1,358,551.

In the transcoder apparatus of the aforesaid U.S. patent application, the color-difference signals supplied to the modulator are augmented by line rate pedestals effecting the insertion of line retrace interval bursts of PAL subcarrier frequency oscillations in the quasi-PAL signal developed by the modulator. The phasing of the inserted bursts alternates between a first phase corresponding to the oscillation phase subject to modulation by R-Y color-difference signals and a second phase differing from the first phase by 180°. Insertion of bursts of the first phase immediately precedes the development of R-Y modulated subcarrier waves by the modulator, while insertion of bursts of the second phase immediately precedes the development of B-Y modulated subcarrier waves by the modulator.

The present invention is directed to novel circuit arrangements which may be advantageously employed for effecting the aforementioned burst insertion in the quasi-PAL signal output of the transcoder.

In transcoder apparatus constructed pursuant to an illustrative embodiment of the present invention, the output of the SECAM FM discriminator, after suitable filtering and de-emphasis, passes through a blanking and burst insertion circuit which performs the following functions: (a) insertion of a blanking pedestal; (b) insertion of a burst gating pulse on the blanking pedestal. The output of the insertion circuit is applied to one of the modulating signal inputs of a balanced modulator. Modulator balance is achieved by applying an appropriate "modulator balance voltage" to the complementary modulating signal input of the modulator. This "modulator balance voltage" desirably equals the modulating signal voltage applied to the first input of the modulator under no-color conditions, (i.e. if the FM input signal is not modulated and thus equals a SECAM subcarrier resting frequency). The "modulator balance voltage" is derived from a so-called "dummy discriminator", which produces a DC voltage which substantially equals under varying conditions the no-color DC level of the FM discriminator output (despite supply voltage fluctuations and/or temperature variations). In order to get modulator balance during blanking, the blanking pedestal is also added to the "modulator balance voltage". However, the burst gating pulse only appears on the blanking pedestal of the modulating signal applied to the first input of the modulator; it is not also added to the "modulator balance voltage". Therefore a modulator unbalance occurs during the presence of the burst gating pulse, resulting in a carrier burst at the modulator output.

Figure 2:
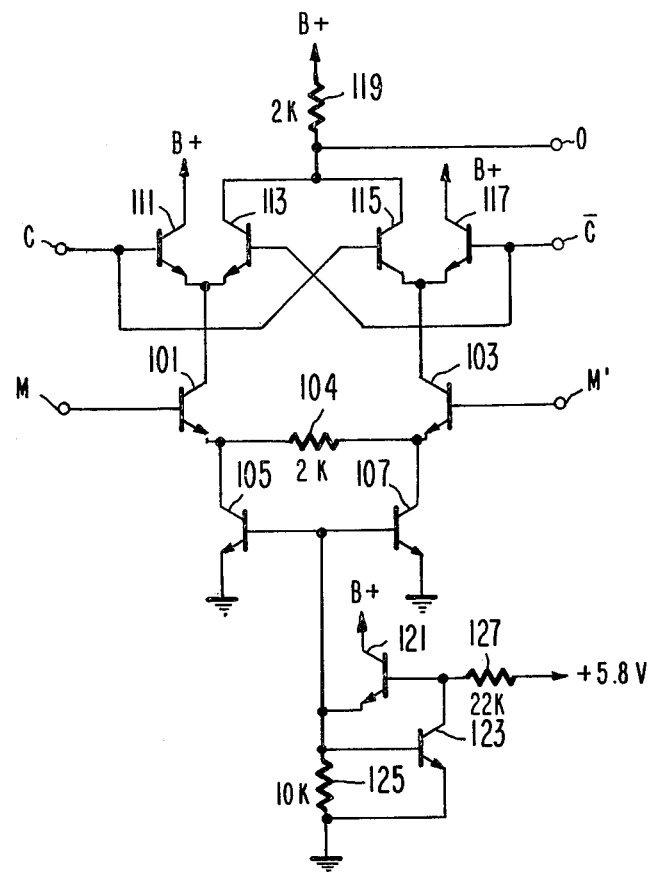

In the accompanying drawing:

FIG. 1 illustrates, partially schematically and partially by block representation, a SECAM-PAL transcoder incorporation burst insertion apparatus embodying principles of the present invention; and FIG. 2 illustrates schematically circuitry which may be employed to implement the balanced modulator function in the transcoder apparatus of FIG. 1, in accordance with an illustrative embodiment of the present invention.

In the apparatus of FIG. 1, a composite video input signal (derived from the video detector, not illustrated, of the color television receiver in which the illustrated transcoder is employed) appears at an input terminal I, and is supplied to a bandpass filter 11. Filter 11 has a passband which encompasses the frequency band occupied by the chrominance signal of a SECAM transmission, and is provided with a bandpass characteristic of a "cloche" or bell-shaped form, appropriately complementary to the characteristic employed for high frequency pre-emphasis of subcarrier sidebands in SECAM signal formation.

A limiter 13 accepts the output of bandpass filter 11, and delivers a limited version thereof to an FM discriminator 15, illustratively of the quadrature detector type, as described, for example, in U.S. Pat. No. 4,232,268. A tuning control circuit 29 is associated with the FM discriminator 15 so as to alter the effective center frequency of its frequency discriminator characteristic in a controlled manner, to be described in detail subsequently, which permits sequential demodulation of the respective R-Y and B-Y subcarrier waves by the single discriminator.

The output of the discriminator 15, appearing at terminal D, is supplied to the base electrode of an NPN transistor 16, disposed as an emitter-follower, with its collector electrode directly connected to the positive terminal (B+) of a DC supply, and its emitter electrode connected via emitter resistor 17 to the negative supply terminal (ground). The output of emitter-follower transistor 16 is supplied via a low pass filter 18 and a series resistor 19 to a demodulated signal output terminal V. Series resistor 19 cooperates with the series combination of resistor 20 and capacitor 21, coupled between terminal V and ground, to form a de-emphasis circuit, with parameters selected to provide a frequency response characteristic complementary to the modulating signal pre-emphasis characteristic employed in SECAM signal formation.

Signals appearing at terminal V are supplied to an identification system 23, comprising SECAM identification circuitry which monitors the output of discriminator 15 to determine the correctness or incorrectness of the sequence of operations therein, and effects adjustment of the operation of the aforementioned tuning control cirucit 29 when sequence correction is required. Illustratively, identification system 23 and the associated tuning control circuit 29 cooperate in the manner described in the copending U.S. Patent Application Ser. No. 020,942. For an understanding of the operation of the identification system in such an arrangement, it is appropriate to first consider the operation of the associated tuning control circuit.

For the single FM discriminator 15 to sequentially develop R-Y and B-Y color-difference signals at terminal V, it is desired that its center frequency tuning be appropriate for demodulation of the R-Y SECAM subcarrier (4.40625 MHz.) during the image portion of an R-Y line interval, and appropriate for demodulation of the B-Y SECAM subcarrier (4.250 MHz.) during the image portion of a B-Y line interval of the received SECAM signal. Accordingly, tuning control circuit 29 is arranged to effect a line-to-line switching of the center frequency tuning in response to half line rate control waves applied thereto; the half line rate control waves are derived from an output terminal FF of a flip-flop 25 triggered by line rate pulses from a burst gating pulse source 27. If the flip-flop phasing is correct, this will result in tuning appropriate for R-Y subcarrier demodulation during image portions of R-Y line intervals, and tuning appropriate for B-Y subcarrier demodulation during image portions of B-Y line intervals; however, if the flip-flop phasing is incorrect, the result will be inappropriate center frequency tuning for the respective line interval image portions.

To aid in identification of such incorrect phasing when it occurs, line rate pulses of burst interval timing from terminal BG of the burst gating pulse source 27 are utilized in combination with the half line rate control waves from terminal FF to effect a composite control of the center frequency tuning, whereby the timing of the changes in center frequency tuning is such that, during the lead-in bursts of the SECAM signal preceding the image portions of both R-Y and B-Y line intervals, the center frequency tuning is the same (e.g., tuned for a center frequency corresponding to the R-Y subcarrier).

As a consequence of holding the same (R-Y) center frequency tuning for all burst intervals, pulses appear in the demodulated signal at terminal V during those alternate line interval blanking portions when the lead-in burst frequency deviates from the R-Y center frequency (i.e., during each lead-in burst occurrence preceding a B-Y line interval). Such pulses are not developed during the intervening line interval blanking portions when the lead-in burst frequency is equal to the R-Y center frequency (i.e., during each lead-in burst occurrence preceding an R-Y line interval).

Illustratively, in the identification system 23, the demodulated signals appearing at terminal V are applied to a pair of sample-and-hold circuits. Using respective half line rate control waves of mutually opposite phase (derived from terminals FF and $\overline{FF}$ of flip-flop 25) and common line rate gating pulses of burst interval timing (derived from terminal BG of source 27) for control of the sampling times of the respective sample-and-hold circuits, one sample-and-hold circuit effects a sampling of the demodulated signals during the lead-in burst occurrence of alternate line intervals; while the other sample-and-hold circuit effects a sampling of the demodulated signals during the lead-in burst occurrence of the intervening line intervals. Comparison of the outputs of the two sample-and-hold circuits in a voltage comparator yields an output at terminal R, which is indicative of the correctness or incorrectness of the flip-flop phasing and which is coupled to a reset input of the flip-flop circuit 25. When the output is indicative of incorrect flip-flop phasing, the flip-flop is shut down and then allowed to restart, whereupon a new comparison is effected, with such a process repeated, if necessary, until correct flip-flop phasing is achieved.

With correct phasing of the operation of flip-flop 25, discriminator 15 operates properly to form a demodulated signal output at terminal V which comprises image-representative R-Y color-difference signal information during the image portions of alternate ones of a succession of line intervals, and image-representative B-Y color-difference signal information during the image portions of the intervening ones of said succession of line intervals. For formation of the quasi-PAL signal output of the transcoder, a signal path is provided for delivery of the color-difference signals appearing at terminal V to a modulating signal input terminal (M) of a balanced modulator 35. This signal path is formed by a level shifting network comprising an emitter-follower utilizing an NPN transistor 30 disposed with its base electrode directly connected to terminal V, with its collector electrode directly connected to the B+ terminal, and with its emitter electrode returned to ground via the series combination of resistors 31 and 33, with the junction of resistors 31, 33 directly connected to modulator terminal M.

The color-difference signals recovered by the SECAM subcarrier demodulating action of discriminator 15 appear at terminal V superimposed upon a DC component, corresponding to the DC level at the discriminator output under no-color signal condition (e.g., occurring when SECAM signal input is at the appropriate resting frequency) as translated via the intervening circuitry to terminal V. To ensure properly balanced operation of modulator 35, whereby subcarrier wave output development is precluded under no-color signal conditions (as is appropriate for the quasi-PAL output signal format), the complementary modulating signal input terminal (M') of balanced modulator 35 is coupled to the output of a second level shifting network (70, 71, 73), matching the level shifting network (30, 31, 33) associated with terminal M, and responsive at its input to a DC potential closely matching the aforementioned DC component developed at terminal V.

The second level shifting network employs an NPN transistor 70 disposed as an emitter-follower, with its collector electrode directly connected to the B+ terminal, and its emitter electrode returned to ground via the series combination of resistors 71 and 73, with the junction of resistors 71, 73 directly connected to terminal M', and with the resistance values of resistors 71, 73 matching the respective resistance values of resistors 31, 33.

The input to the second level shifting network is supplied via a series resistor 63 (matched in resistance value with the series resistor 19 of the de-emphasis network 19, 20, 21) connected between the base electrode of emitter-follower transistor 70 and the emitter electrode of an NPN transistor 60. Transistor 60 is also disposed as an emitter-follower, with its collector electrode directly connected to the B+ terminal, and its emitter electrode returned to ground via an emitter resistor 61 (matched in resistance value with emitter resistor 17). The network formed by elements 60, 61, 63 is designed to exhibit a DC translating characteristic matching the DC translating characteristic of the network formed by elements 16, 17, 18, 19. In this connection, it may be assumed that the design of low pass filter 18 (not shown in schematic detail) is compatible with achievement of such matching (i.e., by effecting its filtering function without DC level shift introduction).

A DC potential input for the base electrode of transistor 60, closely matching the DC level attained by the discriminator output at terminal D under no-color signal conditions, is supplied by a "dummy discriminator." The "dummy discriminator" function is served by an NPN transistor 40 disposed as a common-emitter DC amplifier, with its collector electrode connected via a load resistor 45 to the B+ terminal its emitter electrode returned to ground via emitter resistor 43, and its base electrode connected by resistor 41 to the output terminal B of a bias source. Illustratively, the bias source, which additionally serves to supply biasing to discriminator 15, comprises an emitter-follower formed by NPN transistor 50, with its collector electrode directly connected to the B+ terminal, its emitter electrode returned to ground via an emitter resistor 51, and its base electrode connected to a point of +1.9 volt potential. The circuit parameters of the "dummy discriminator" are chosen so as to supply an output voltage which equals the no-color DC level of the discriminator output at terminal D under varying temperature and supply voltage conditions.

During the image portions of the successive line intervals when color-difference signals appear at terminal V, the base-emitter paths of transistors 30 and 70 are forward biased, enabling the respective signal paths for application of the color-difference signals to modulator terminal M, and application of the modulator balance voltage derived from the "dummy discriminator" to modulator terminal M'.

Balanced modulator 35 has a pair of carrier wave input terminals C, $\overline{C}$, which are driven in push-pull by waves of PAL subcarrier frequency developed in a subcarrier phase switching circuit 37 from reference oscillations derived from the receiver's PAL decoder apparatus. The phasing of the supplied waves is altered pursuant to a predetermined sequence, as controlled by switching control waves supplied to switching circuit 37 from terminals FF and $\overline{FF}$ of flip-flop 25, and terminal BG of burst gating pulse source 27.

Illustratively, pursuant to an approach described in aforementioned U.S. Pat. No. 4,233,622, the operation of the subcarrier phase switching circuit 37 is carried out in such a way that the following results are obtained:

(A) During the image portion of a line interval when B-Y color-difference signals are supplied to terminal M, the subcarrier waves delivered to terminal C are of a first phase;

(B) During the image portion of a line interval when R-Y color-difference signals are supplied to terminal M, the subcarrier waves delivered to terminal C are of a second phase, leading the first phase by 90°;

(C) During appearance of a burst gating pulse at terminal BG, in the blanking period immediately preceding delivery of R-Y color-difference signals to terminal M, the subcarrier waves delivered to terminal C are of said second phase; and (D) During appearance of a burst gating pulse at terminal BG, in the blanking period immediately preceding delivery of B-Y color-difference signals to terminal M, the subcarrier waves delivered to terminal C are of a third phase, differing from said second phase by 180° and lagging said first phase by 90°.

Alterations of the phasing of the subcarrier waves delivered to terminal $\overline{C}$ take place in a manner maintaining the anti-phasal relationship between the respective carrier wave inputs to modulator 35.

During period (A) above, PAL subcarrier frequency oscillations of the first phase appear at the modulator output terminal O, subject to amplitude modulation in accordance with the B-Y color-difference signal information recovered by discriminator 15. During period (B) above, PAL subcarrier frequency oscillations of the second phase appear at the modulator output terminal O, subject to amplitude modulation in accordance with the R-Y color-difference signal information recovered by discriminator 15. During scanning of uncolored image regions, when the SECAM subcarrier signals remain at their resting frequencies, oscillations disappear from output terminal O due to the balanced relationship between the signal levels at the respective modulating signal input terminals M, M'. The output signal appearing at terminal O, of the quasi-PAL form disclosed in the aforementioned U.K. Pat. No. 1,358,551, is supplied as a chrominance signal input to the receiver's PAL decoder apparatus.

The emitter-collector path of the discriminator output translating transistor 30 is shunted by the emitter-collector path of an NPN transistor 90, with the collector electrode of transistor 90 directly connected to the B+ terminal, and the emitter electrode of transistor 90 directly connected to the emitter electrode of transistor 30. Similarly, the emitter-collector path of the "dummy discriminator" output translating transistor 70 is shunted by the emitter-collector path of an NPN transistor 100, with the collector electrode of transistor 100 directly connected to the B+ terminal, and the emitter electrode of transistor 100 directly connected to the emitter electrode of transistor 70.

A pair of resistors 85, 87 are connected in series between the base electrodes of transistors 90 and 100. A resistor 83 is connected between ground and the junction of resistors 85, 87. An NPN transistor 80 is disposed as an emitter-follower, with its collector electrode directly connected to the B+ terminal, its base electrode connected to a blanking waveform input terminal BL (and connected via a resistor 81 to the B+ terminal), and its emitter electrode directly connected to the junction of resistors 85, 87.

During the line interval image portions when image-representative color-difference signals appear at terminal V, the blanking waveform appearing at terminal BL swings sufficiently low that transistor 80 is cut off. In the absence of conduction by transistor 80 during those periods, the base-emitter paths of transistors 90, 100 are reverse-biased so that transistors 90 and 100 are held off. However, during the periods intervening such color-difference signal appearances, the blanking waveform at terminal BL swings high, rendering transistor 80 strongly conducting, with the consequence that transistors 90 and 100 are turned on. Conduction by transistors 90 and 100 during these intervening periods is such as to elevate the potentials at the emitter electrodes of transistors 30 and 70 to a level rendering transistors 30 and 70 nonconducting. Under these circumstances, the signal paths normally supplying the outputs of discriminator 15 and the "dummy discriminator" to the respective modulator terminals M, M' are disrupted. Instead, terminals M and M' receive elevated blanking pedestals of matching magnitude, supplied by the respective transistors 90 and 100 via the matched dividers 31, 33 and 71, 73. During undisturbed presence of matching pedestals at the respective terminals M, M', oscillation appearance at output terminal O is precluded.

To provide the desired burst components for the quasi-PAL signal output at terminal O, during the periods (C) and (D) discussed above, burst gating pulses appearing at terminal BG are supplied to the base electrode of transistor 90. During each burst gating pulse appearance, terminal M is caused to depart from the aforementioned blanking pedestal level. With the conducting transistor 80 effectively clamping the junction of resistors 85, 87 to the potential of the B+ terminal, the application of the burst gating pulse to the base electrode of transistor 90 has no significant effect on the potential at the base electrode of transistor 100. Accordingly, during each burst gating pulse appearance, terminal M' does not depart from the aforementioned blanking pedestal level.

The resultant imbalance between the levels at terminals M, M' causes appearance of a burst of PAL subcarrier frequency oscillations of respectively appropriate phase at output terminal O during the periods (C) and (D). The magnitude of the burst gating pulse supplied to the base electrode of transistor 90 is chosen to provide the quasi-PAL signal with a burst component magnitude of a level assuring unkilling action by the color killer circuits of the PAL decoder apparatus, and adjustment of chrominance signal gain to a desired level by the ACC circuits of the PAL decoder apparatus.

It will be noted that the cutoff of transistor 30 throughout each blanking period bars the delivery to terminal M of the pulses developed at terminal V in response to alternate lead-in burst occurrences in the received SECAM signal, thus avoiding alternate line disturbances of the desired magnitude for the burst component of the output quasi-PAL signal.

FIG. 2 illustrates circuitry which may be employed advantageously to implement the functions of balanced modulator 35 in the FIG. 1 arrangement. In FIG. 2, the modulating signal input terminals M, M' are respectively connected to the base electrodes of respective NPN transistors 101 and 103. The emitter electrodes of transistors 101 and 103 are interconnected by a resistor 104. The collector-emitter paths of respective NPN current source transistors 105 and 107 are connected respectively between the emitter electrodes of transistors 101, 103 and ground.

Bias for the base electrodes of current source transistors 105, 107 is supplied in common from a $v_{be}$ supply (121, 123, 125, 127) of the type shown in U.S. Pat. No. 3,430,155. The bias supply includes an NPN transistor 121 disposed as an emitter-follower, with its collector electrode directly connected to the B+ terminal, its emitter electrode connected to ground via resistor 125, and its base electrode connected via resistor 127 to a point of 5.8 volt potential. An additional NPN transistor 123 is disposed as a common-emitter stage, with its base electrode directly connected to the emitter electrode of transistor 121, with its emitter electrode directly connected to ground, and with its collector electrode directly connected to the base electrode of transistor 121. A direct connection is provided between the bias supply output terminal (emitter electrode of transistor 12) and the base electrodes of current source transistors 105, 107.

A pair of NPN transistors 111, 113 are disposed in a differential amplifier configuration, with their interconnected emitter electrodes directly connected to the collector electrode of transistor 101. A second pair of NPN transistors 115, 117 are also disposed in a differential amplifier configuration, with their interconnected emitter electrodes directly connected to the collector electrode of transistor 103. Oscillations of PAL subcarrier frequency applied to carrier wave input terminal C are directly supplied in common to the base electrodes of transistors 111 and 115. Oscillations of similar magnitude applied to the complementary carrier wave input terminal $\overline{C}$ (in anti-phasal relationship to the oscillations applied to terminal C) are directly supplied to the base electrodes of transistors 113 and 117.

The collector electrodes of transistors 111 and 117 are directly connected to the B+ terminal. A common load resistor 119 is provided for transistors 113 and 115, and connected between their interconnected collector electrodes and the B+ terminal. The modulator output terminal O is directly connected to the interconnected collector electrodes of transistors 113 and 115.

In the arrangement of FIG. 2, when the respective modulating signal terminals M, M' are maintained at matching DC levels, a balance condition exists which precludes subcarrier oscillation appearance at output terminal O. However, when the potentials at terminals M and M' are unbalanced, subcarrier oscillations appear at output terminal O with an amplitude dependent upon the magnitude of imbalance.

In an illustrative utilization of the present invention, circuitry of all of the illustrated elements of the FIG. 1 arrangement, with the exception of filters 11 and 15 and de-emphasis circuit 19, 20, 21, are subject to realization on a common monolithic integrated circuit chip, and utilization with a power supply establishing a +12 volt potential at the B+ terminal.

What is claimed is:

1. Apparatus for converting an image-representative chrominance component of received signals which are encoded in SECAM fashion to a chrominance signal suitable for application to a PAL decoder, said apparatus comprising:

frequency discriminator means, responsive to said chrominance information encoded in SECAM fashion, for sequentially developing respective first and second color-difference signals superimposed upon a common DC component;

a source of oscillations of a frequency corresponding to the standard PAL color subcarrier frequency;

a balanced modulator having a pair of carrier wave input terminals, first and second modulating signal input terminals, and an output terminal;

means for applying oscillations from said source in push-pull to said carrier wave input terminals;

means for applying the output of said frequency discriminator means to said first modulating signal terminal;

means for applying a first DC potential matching said DC component to said second modulating signal terminal;

means, operative during periodic intervals of said received signals which are free of said image-representative chrominance component, for applying a second DC potential in common to said first and second modulating terminals, while disabling said discriminator output applying means and said first DC potential applying means; and means, operative during only selected segments of said periodic intervals, for applying a burst gating pulse to only one of said modulating signal terminals.

2. Apparatus in accordance with claim 1, wherein:

said frequency discriminator output applying means includes a first transistor, having base, emitter, and collector electrodes, disposed as an emitter-follower, with its base electrode receiving said discriminator output and its emitter electrode coupled to said first modulating signal input terminal;

said first DC potential applying means includes a second transistor, having base, emitter, and collector electrodes, disposed as an emitter-follower, with its emitter electrode coupled to said second modulating signal input terminal; and said second DC potential applying means includes third and fourth transistors, each having base, emitter, and collector electrodes, and each disposed as an emitter-follower, with the emitter electrode of the third transistor directly connected to the emitter electrode of said first transistor, and with the emitter electrode of said fourth transistor directly connected to the emitter electrode of said second transistor;

said second DC potential applying means also including means for applying, in common, to the base electrodes of said third and fourth transistors, during said periodic intervals, a DC potential of such magnitude as to render said third and fourth transistors conducting and said first and second transistors nonconducting; and wherein said burst gating pulse applying means includes means for supplying a burst gating pulse to the base electrode of only one of said third and fourth transistors.

3. Apparatus in accordance with claim 2:

wherein said image-representative chrominance component appears during image portions of a succession of line intervals, said image portions of said line intervals following chrominance-free blanking portions thereof, with said burst gating pulse applying means operative during respective segments of said blanking portions; and wherein said oscillation applying means includes means for delivering, to a given one of said carrier wave input terminals: (1) oscillations of a first phase, during the image portions of alternate ones of said succession of line intervals; (2) oscillations of a second phase, differing from said first phase by 90°, during the image portions of the intervening ones of said succession of line intervals; (3) oscillations of said first phase, during said blanking portion segments of said alternate line intervals; and (4) oscillations of a third phase, differing from said first phase by 180°, during said blanking portion segments of said intervening line intervals.

* * * * *